(12) United States Patent
Trainer et al.

(10) Patent No.: US 12,352,212 B2
(45) Date of Patent: Jul. 8, 2025

(54) ELECTRICALLY STARTING A GAS TURBINE ENGINE

(71) Applicant: ROLLS-ROYCE plc, London (GB)

(72) Inventors: David R Trainer, Derby (GB); Mark Sweet, Chesterfield (GB); Matthew S Cartwright, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 18/672,887

(22) Filed: May 23, 2024

(65) Prior Publication Data

US 2025/0188870 A1 Jun. 12, 2025

(30) Foreign Application Priority Data

Jun. 12, 2023 (GB) ..................................... 2308720

(51) Int. Cl.
*F02C 7/268* (2006.01)

(52) U.S. Cl.
CPC .......... *F02C 7/268* (2013.01); *F05D 2260/85* (2013.01); *F05D 2270/52* (2013.01)

(58) Field of Classification Search
CPC ... F02C 7/268; F05D 2260/85; F05D 2270/52
See application file for complete search history.

(56) References Cited

U.S. PATENT DOCUMENTS

| | | | |
|---|---|---|---|
| 9,422,905 B2* | 8/2016 | Anastasio | F02N 11/04 |
| 2006/0042267 A1* | 3/2006 | Thompson | F01D 19/00 |
| | | | 60/786 |
| 2014/0197681 A1* | 7/2014 | Iwashima | B60L 53/55 |
| | | | 307/9.1 |
| 2016/0039371 A1* | 2/2016 | Blumer | B60L 50/10 |
| | | | 290/31 |
| 2016/0208709 A1 | 7/2016 | Huang | |
| 2017/0264178 A1 | 9/2017 | Stauder et al. | |
| 2019/0181786 A1 | 6/2019 | Singh et al. | |
| 2020/0083831 A1 | 3/2020 | Rozman et al. | |
| 2021/0167597 A1 | 6/2021 | Gritsch | |
| 2021/0172382 A1 | 6/2021 | Bruce | |
| 2021/0347491 A1 | 11/2021 | Delbosc et al. | |

(Continued)

FOREIGN PATENT DOCUMENTS

EP 3 832 827 A1 6/2021

OTHER PUBLICATIONS

Oct. 17, 2024 Extended Search Report issued in European Patent Application No. 24176929.8.

(Continued)

*Primary Examiner* — Ted Kim
(74) *Attorney, Agent, or Firm* — Oliff PLC

(57) ABSTRACT

Aircraft power and propulsion systems and methods thereof; an aircraft power and propulsion system includes: a gas turbine engine having first and second spools; one or more electrical networks; a first electrical machine joined with the first spool; a second electrical machine joined with the second spool; a first power converter having first and second sides; a second power converter having first and second sides; and a controllable switching arrangement in which a connection to the first side of the second power converter is switchable between: a winding of the second electrical machine, or the winding of the first electrical machine.

20 Claims, 5 Drawing Sheets

(56) References Cited

U.S. PATENT DOCUMENTS

2022/0049658 A1    2/2022  Bruce et al.
2023/0123533 A1*   4/2023  Chivite Zabalza .... B64D 31/16
                                                    60/793

OTHER PUBLICATIONS

Dec. 15, 2023 Search Report issued in United Kindgom Patent Application No. 2309160.6.
Dec. 7, 2023 Search Report issued in United Kingdom Patent Application No. 2308720.8.
U.S. Appl. No. 18/672,921, filed May 23, 2024 in the name of Trainer et al.

* cited by examiner

ELECTRICALLY STARTING A GAS TURBINE ENGINE

CROSS-REFERENCE TO RELATED APPLICATIONS

This specification is based upon and claims the benefit of priority from United Kingdom Patent Application No. 2308720.8, filed on 12 Jun. 2023, the entire contents of which are incorporated herein by reference.

TECHNICAL FIELD

The disclosure relates to an electrical power system for electrically starting a gas turbine engine and to methods of electrically starting a gas turbine engine.

BACKGROUND

One way of starting an aircraft gas turbine engine uses a so-called electric starter-generator. A starter-generator includes a rotary electrical machine that is mechanically coupled to a starting spool (e.g., a high-pressure (HP) or intermediate-pressure (IP) spool) of the gas turbine engine. During normal operation of the gas turbine engine, the starter-generator is operated in a generator mode and extracts mechanical power from the spool to generate electrical power for use in the engine and airframe. However, the starter-generator can also be used to start or restart the gas turbine engine, by operating in a motor mode. The electrical machine is supplied with electrical power from a power source, for example ground equipment, an auxiliary power unit (APU) or an on-board energy storage system, from which the electrical machine produces a torque that drives rotation of the starting spool. The combustion equipment of the gas turbine engine is ignited when the starting spool reaches a rotational speed sufficient to provide adequate airflow through the engine core.

Weight is a key consideration in aircraft. For a starter-generator, it is necessary to include the electrical machine, whose weight will generally increase with the torque rating of the machine. Most starter-generator systems will also include one or more power electronics converters, for example AC-DC converters, AC-AC converters and/or DC-DC converters depending on the implementation. The weight of a power converter generally increases with the output power and current ratings of the converter. In many cases, the ratings of the components of a starter-generator, and therefore also their weight, are dictated by the starting requirements because the operating torque and current are generally lower when operating in the generator mode. It would be advantageous to reduce the required ratings of components of a starter-generator, as this may lead to weight reductions and efficiency improvements.

United States Patent Application Publication US 2022/0049658 A1 describes a way of reducing the required torque rating of the electrical machine of a starter-generator. The torque rating of the electrical machine is selected to be lower than the starting torque of the starting spool. The difference between the starting torque and torque rating of the electrical machine is supplied by the permanent magnet alternator (PMA) of the engine operated as a motor. The PMA is a small electrical generator included in many aircraft, dedicated to generating power for the aircraft's safety-critical controller (e.g., a FADEC), and is conventionally not used in a motor mode.

SUMMARY

The present disclosure provides aircraft power and propulsion systems in which output current ratings of power converters used to supply a starting current to a starter-generator may be reduced. In some embodiments, a power converter may have an output current rating below the current required by the electrical machine to provide the starting torque. In other embodiments, a power converter may have an output current rating greater than the current required by the electrical machine to provide the starting torque, but a degree to which the output current rating is overrated to provide a desired degree of fault tolerance may be reduced. In still other embodiments, output current ratings of power converters may not be changed, but a higher starting torque may be available without additional electrical machine weight.

According to a first aspect, there is provided an aircraft power and propulsion system, comprising:
a gas turbine engine having a first spool and a second spool, the first spool being a designated starting spool;
one or more electrical networks;
a first electrical machine mechanically coupled with the first spool;
a second electrical machine mechanically coupled with the second spool;
a first power converter having a first side and a second side, wherein the first side of the first power converter is connected to a winding of the first electrical machine, and the second side of the first power converter is connected to one of the electrical networks;
a second power converter having a first side and a second side, wherein the second side of the second power converter is connected to one of the one or more electrical networks; and
a controllable switching arrangement configured so that a connection to the first side of the second power converter is switchable between:
a winding of the second electrical machine, whereby the second electrical machine and the second power converter are configured to extract power from the second spool in a generator mode or drive rotation of the second spool in a motor mode; or
the winding of the first electrical machine, whereby the first and second power converters are connected in parallel to the winding of the first electrical machine for supplying a starting current to the winding of the first electrical machine for starting or restarting the gas turbine engine.

The first electrical machine may be rated to produce at least a rated starting torque, $T_{start}$, of the gas turbine engine; and a current, $I_{start}$, required by the winding of the first electrical machine to produce the starting torque may be greater than a rated current output of the first power converter but less than or equal to a sum of the rated current output of the first power converter and a rated current output of the second power converter.

The aircraft power and propulsion system may comprise a control system. The control system may have roles including controlling the state of the switching arrangement and controlling switching states of semiconductor switches (e.g., MOSFETs) of the power converters. The control system may be a single controller or multiple, distributed controllers. The control system may be implemented in hardware, software or a mix of hardware and software. The controller may be an engine electronic controller (EEC), for example a full-authority digital engine controller (FADEC).

The control system may be configured to: respond to a request to start or restart the gas turbine engine by controlling the switching arrangement to disconnect the first side of the second power converter from the winding of the second electrical machine and to connect the first side of the second power converter to the stator winding of the first electrical machine.

The control system may be configured to: following an engine start or restart, stop current flow through the second power converter by controlling a switching state of one or more transistors of the second power converter; and after stopping current flow through the second power converter, controlling the switching arrangement to disconnect the first side of the second power converter from the winding of the first electrical machine and to connect the first side of the second power converter to the winding of the second electrical machine.

The controllable switching arrangement may be further configured so that a connection to the first side of the first power converter is switchable between: the winding of the first electrical machine; or the winding of the second electrical machine. In this case, the control system may be further configured to: in response to a fault in the first electrical machine, disconnect the first side of the first power converter from the winding of the first electrical machine and to connect the first side of the first power converter to the winding of the second electrical machine, whereby the faulted first electrical machine is isolated and both the first power converter and the second power converter can receive electrical power from or supply electrical power to the winding of the second electrical machine; and in response to a fault in the second electrical machine, disconnect the first side of the second power converter from the winding of the second electrical machine and to connect the first side of the second power converter to the winding of the first electrical machine, whereby the faulted second electrical machine is isolated and both the first power converter and the second power converter can receive electrical power from or supply electrical power to the winding of the first electrical machine.

The gas turbine engine may be a two-spool gas turbine engine, the first spool may be a high-pressure (HP) spool, and the second pool may be a low-pressure (LP) spool.

The gas turbine engine may be a three-spool gas turbine engine, the first spool may be an HP spool, and the second pool may be an intermediate-pressure (IP) spool or a LP spool.

The gas turbine engine may be a three-spool gas turbine engine, the first spool may be an IP spool, and the second pool may be a LP spool.

The gas turbine engine may have a third spool, and the aircraft power and propulsion system may further comprise: a third electrical machine mechanically coupled with the third spool; and a third power converter having a first side and a second side, wherein a second side of the third power converter is connected to one of the one or more electrical networks, and wherein the controllable switching arrangement is further configured so that a connection to the first side of the third power converter is switchable between: a winding of the third electrical machine, whereby the third electrical machine and the third power converter are configured to extract power from the third spool in a generator mode or drive rotation of the third spool in a motor mode; or the winding of the first electrical machine, whereby the first and third power converters are connected in parallel with the winding of the first electrical machine for supplying a starting current to the winding of the first electrical machine for starting or restarting the gas turbine engine.

The control system may be configured to: respond to a request for an engine start or restart attempt by disconnecting the respective first sides of the second and third power converters from the windings of the second and third electrical machines and to connect the respective first sides of the second and third power converters to the winding of the first electrical machine, whereby the first, second and third power converters are connected in parallel to the winding of the first electrical machine for supplying a starting current to the winding of the first electrical machine; and subsequent to connecting the respective first sides of the second and third power converters to the winding of the first electrical machine, disconnecting the first side of the third power converter from the winding of the first electrical machine and connecting the first side of the third power converter to the winding of the third electrical machine, whereby the third power converter can supply current to third electrical machine to drive rotation of the third spool of the gas turbine engine.

The control system may be configured to disconnect the first side of the third power converter from the winding of the first electrical machine and to connect the first side of third power converter to the winding of the third electrical machine in response to determining a condition to the effect that a rotational speed of the first spool of the gas turbine engine has passed a threshold speed.

The first spool may be an HP spool, the second spool may be LP spool, and the third spool may be an IP spool.

The aircraft power and propulsion system may further comprise an energy storage system, ESS, connected to and configured to supply electrical power to one or more of the one or more electrical networks. The ESS may include a battery.

The one or more electrical networks may be DC electrical networks, and the first power converter and the second power converter (and the third power converter if present) may be AC-DC power converters. In this case, the first side of each respective power converter is an AC-side of the power converter, the respective second side of each power converter is a DC-side of the power converter.

Each of the AC-DC power electronics converters may be a bi-directional AC-DC converter (e.g., may be operable as an inverter or as a rectifier). Any suitable converter circuit may be used, for example a two-level AC-DC converter circuit (e.g., two-level, three-phase) or H-bridge circuits.

The one or more electrical networks may be AC electrical networks, and the first and second power converters may be AC-AC power converters.

The first and second AC-AC power converters may comprise back-to-back AC-DC and DC-AC stages. Alternatively, the AC-AC converters may be matrix converters.

The switching arrangement may include mechanical switches such as contactors (e.g., 3-phase contactors) or semiconductor switches (e.g., solid state circuit breakers (SSCBs)).

Each respective electrical machine may be a permanent magnet synchronous electrical machine, the respective windings being stator windings. Any suitable machine type may be used, however.

According to a second aspect, there is provided an aircraft comprising an aircraft power and propulsion system according to the first aspect or the third aspect. In some embodiments, the aircraft has one gas turbine engine or two gas turbine engines. The aircraft may, however, have more than two gas turbine engines.

According to a third aspect, a method of starting a gas turbine engine of the aircraft power and propulsion system of the first aspect is provided. The method comprises: receiving, by a control system of the power and propulsion system, a request to start or restart the gas turbine engine; controlling the switching arrangement to disconnect the first side of the second power converter from the winding of the second electrical machine and to connect the first side of the second power converter to the winding of the first electrical machine; supplying electrical power from one or more electrical power sources to the electrical network connected to the second side of the first power converter and to the electrical network connected to the second side of the second power converter; and supplying electrical power from both the first power converter and the second power converter to the winding of the first electrical machine to produce a starting torque for starting the gas turbine engine.

A further method is provided, applicable where the gas turbine engine has a third spool and the power and propulsion system includes a third electrical machine and third power converter. The method comprises: receiving, by a control system of the power and propulsion system, a request to start or restart the gas turbine engine; controlling the switching arrangement to disconnect the first side of the second power converter from the winding of the second electrical machine and to connect the first side of the second power converter to the winding of the first electrical machine; controlling the switching arrangement to disconnect the first side of the third power converter from the winding of the third electrical machine and to connect the first side of the third power converter to the winding of the first electrical machine; supplying electrical power from one or more electrical power sources to the electrical network connected to the second side of the first power converter, to the electrical network connected to the second side of the second power converter, and to the electrical network connected to the second side of the third power converter; supplying electrical power from the first power converter, the second power converter and the third power converter to the winding of the first electrical machine to produce a starting torque for driving rotation of the first spool; detecting a condition to the effect that a speed of the first spool has passed a threshold; controlling the switching arrangement to disconnect the first side of the third power converter from the winding of the first electrical machine and to connect the first side of the third power converter to the winding of the third electrical machine; and supplying electrical power from the third power converter to the winding of the third electrical machine to produce a starting torque for driving rotation of the third spool.

The skilled person will appreciate that except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
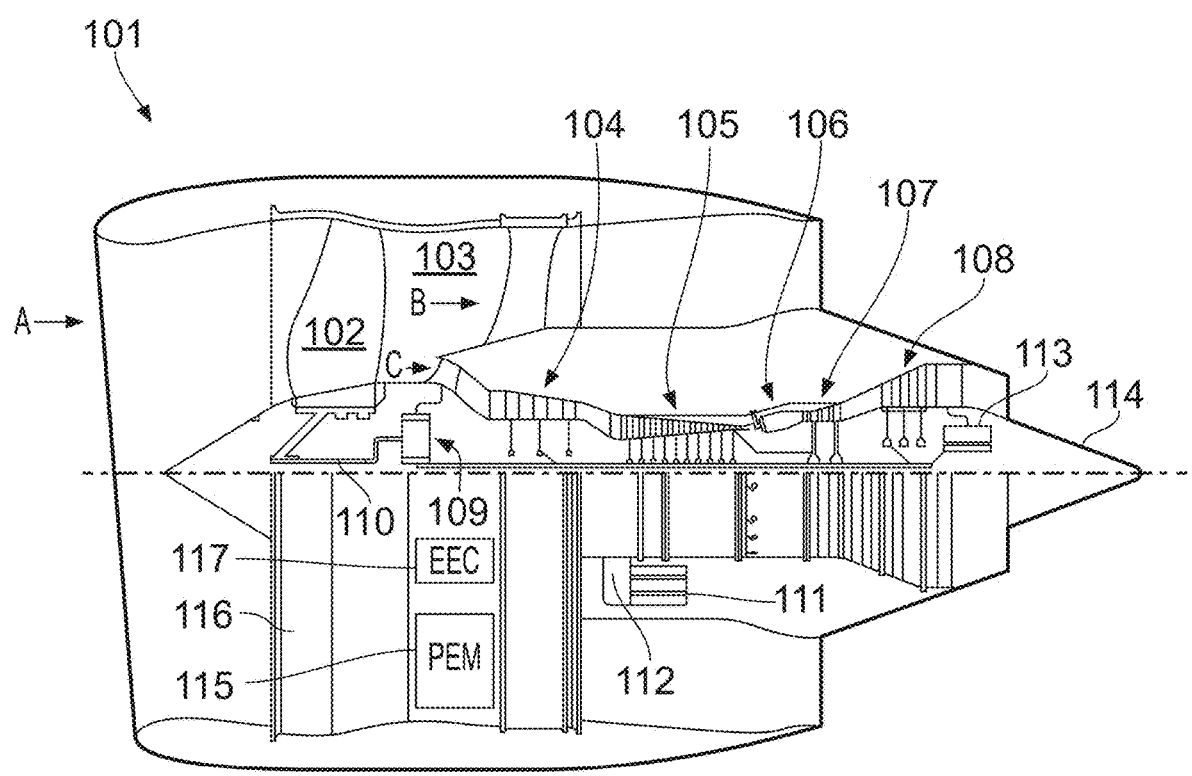
FIG. 1 shows a general arrangement of a turbofan engine for an aircraft.

A general arrangement of an engine 101 for an aircraft is shown in FIG. 1. The engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure (LP) compressor 104, a high-pressure (HP) compressor 105, a combustor 106, an HP turbine 107, and a LP turbine 108.

In operation, the core flow C is compressed by the LP compressor 104 and is then directed into the HP compressor 105 where further compression takes place. The compressed air exhausted from the HP compressor 105 is directed into the combustor 106 where it is mixed with fuel and the mixture is combusted. The resultant hot combustion products then expand through, and thereby drive, the HP turbine 107 and in turn the low-pressure turbine 108 before being exhausted to provide a small proportion of the overall thrust.

The HP turbine 107 drives the HP compressor 105 via an interconnecting shaft. The LP turbine 108 drives the LP compressor 104 via another interconnecting shaft. Together, the HP compressor 105, HP turbine 107, and associated interconnecting shaft form part of a HP spool of the engine 101. Similarly, the LP compressor 104, LP turbine 108, and associated interconnecting shaft form part of a LP spool of the engine 101. Such nomenclature will be familiar to those skilled in the art. Those skilled in the art will also appreciate that whilst the illustrated engine has two spools, other gas turbine engines have a different number of spools, e.g., three spools.

The fan 102 is driven by the LP turbine 108 via a reduction gearbox in the form of a planetary-configuration epicyclic gearbox 109. Thus in this configuration, the LP turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative embodiments a star-configuration epicyclic gearbox (in which the planet carrier is static and the ring gear rotates and provides the output) may be used instead, and indeed that the gearbox 109 may be omitted entirely so that the fan 102 is driven directly by the LP turbine 108.

It is increasingly desirable to facilitate a greater degree of electrical functionality on the airframe and on the engine. To this end, the engine 101 of FIG. 1 comprises one or more rotary electrical machines, generally capable of operating both as a motor and as a generator. The number and arrangement of the rotary electrical machines will depend to some extent on the desired functionality. Some embodiments of the engine 101 include a single rotary electrical machine 111 driven by the HP spool, for example by a core-mounted accessory drive 112 of conventional configuration. Such a configuration facilitates the generation of electrical power for the engine and the aircraft and the driving of the HP spool to facilitate starting of the engine in place of an air turbine starter. Other embodiments, including the one shown in FIG. 1, comprise both a first rotary electrical machine 111 coupled with the HP spool and a second rotary electrical machine 113 coupled with the LP spool. In addition to generating electrical power and the starting the engine 101, having both first and second rotary machines 111, 113, connected by power electronics, can facilitate the transfer of mechanical power between the HP and LP spools to improve operability, fuel consumption etc.

As mentioned above, in FIG. 1 the first rotary electrical machine 111 is driven by the HP spool by a core-mounted accessory drive 112 of conventional configuration. In alternative embodiments, the first electrical machine 111 may be mounted coaxially with the turbomachinery in the engine 101. For example, the first electrical machine 111 may be mounted axially in line with the duct between the LP and HP compressors 104 and 105. In FIG. 1, the second electrical machine 113 is mounted in the tail cone 114 of the engine 101 coaxially with the turbomachinery and is coupled to the LP turbine 108. In alternative embodiments, the second rotary electrical machine 113 may be located axially in line with low-pressure compressor 104, which may adopt a bladed disc or bladed drum configuration to provide space for the second rotary electrical machine 113. It will of course be appreciated by those skilled in the art that any other suitable location for the first and second electrical machines may be adopted.

The first and second electrical machines 111, 113 are connected with power electronics. Extraction of power from or application of power to the electrical machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electrical machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e., both of the core gas turbine and the first and second electrical machines 111 and 113. In this way, the EEC 117 may holistically respond to both thrust demand and electrical power demand.

The one or more rotary electrical machines 111, 113 and the power electronics 115 may be configured to output to or receive electric power from one, two or more DC networks. The DC networks allow for the distribution of electrical power to other engine electrical loads and to electrical loads on the airframe.

The electric machines 111, 113 coupled to the HP and LP spools may be used to motor the spools and may therefore be used for engine starting and restarting. In a two-spool engine, the HP spool is usually the designated starting spool. In a three-spool engine, the HP and/or intermediate-pressure (IP) spools may be the starting spools.

As mentioned previously, where electrical machines are used for engine starting, it is often the engine starting mode that dictates the rating requirements of the electrical machines and associated power converters. This is because the torques, powers and currents involved in starting an engine are generally greater than those involved in 'normal' operation (e.g., generation of power for the engine and aircraft, addition of power to a shaft to manage surge margin by motoring). A result is that, for a majority of the time, the electrical machines and converters will be operated below, and potentially significantly below, their ratings. This is sub-optimal from the perspective of platform weight.

Figure 2:
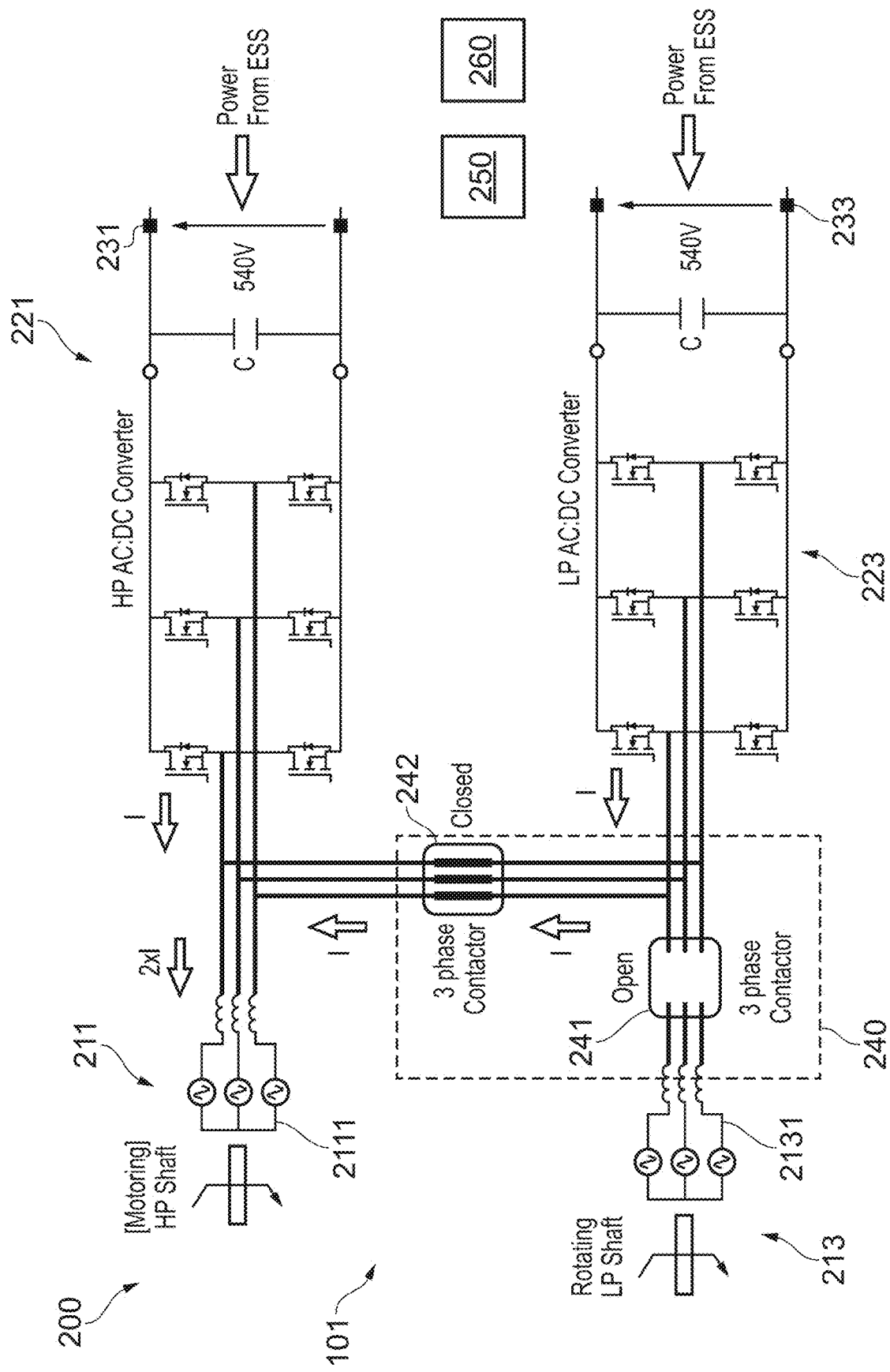
FIG. 2 is a schematic diagram of an example aircraft power and propulsion system, illustrating the parallel connection of AC-DC power converters associated with different spools of the engine.

FIG. 2 illustrates a portion of an exemplary aircraft power and propulsion system 200. The power and propulsion system 200 includes a gas turbine engine 101, which in this example is a two-spool gas turbine engine having an HP spool and an LP spool. The HP spool is the designated starting spool of the engine 101. In other words, to start the engine, the HP spool is accelerated until it reaches a speed where the resulting airflow through the core of the engine 101 allows the combustion equipment 106 to be ignited.

The HP spool is mechanically coupled to a rotor of a first electrical machine 211. The LP spool is mechanically coupled to a rotor of a second electrical machine 213. The mechanical couplings between the spools and electrical machines 211, 213 may be indirect (e.g., through an AGB of the engine 101) or direct (e.g., the electrical machines may be coaxial with and directly coupled to the engine shafts). The electrical machines 211, 213 may be of any suitable type and configuration, but in the present example the electrical machines are three-phase permanent magnet synchronous electrical machines. Other suitable electrical machine types may include reluctance machines (switched and synchronous), induction and wound field type machines.

The windings (e.g., stator windings 2111) of the first electrical machine 211 are connected to an AC-side of a first AC-DC power electronics converter 221. The DC-side of the first AC-DC converter 221 is connected to a DC electrical network 231, which in this example operates at 540 V. Another operating voltage may be selected if desired, however.

The system 200 also includes a second AC-DC power electronics converter 223, a DC-side of which is connected to a DC electrical network 233, also shown to have an operating voltage of 540 V. The DC electrical networks 231, 233 may be separate, independent electrical networks that are not connected together. However, in some embodiments, the DC sides of the first and second AC-DC converters 221, 223 may be connected to a common DC electrical network (i.e., DC networks 231, 233 may be the same electrical network).

Notably, the system 200 also includes a controllable switching arrangement 240. The switching arrangement allows the AC-side of the second AC-DC converter 223 to be connected to either the windings of the second (LP) electrical machine 2131 or to the windings 2111 of the first (HP) electrical machine 211. This provides several operating modes, described below. The switching arrangement 240 is controlled by a control system 260, which may be or may interface with, e.g., an EEC 117 as described above.

The switching arrangement 240 is shown to take the form of two sets of contactors: a first set of contactors 241 connected between the AC-side of the second AC-DC converter 223 and the windings 2131 of the second (LP) electrical machine 213, and a second set of contactors 242 connected between the AC-side of the second AC-DC converter 223 and the windings 2111 of the first (HP) electrical machine 211. The switching arrangement 240 could, however, be implemented in other ways, for example using semiconductor switches such as solid-state circuit breakers (SSCBs).

During normal operation of the power and propulsion system 200, the control system 260 closes the first set of contactors 241 and opens the second set of contactors 242 so that the AC-side of the second AC-DC converter 223 is connected with the windings 2131 of the second electrical machine 213. With this switching configuration, the second electrical machine 213 and second AC-DC converter 223 may operate in a generator mode, whereby mechanical power is extracted from the LP spool and electrical power is generated therefrom and supplied to the DC network 233. Alternatively, the second electrical machine 213 and second AC-DC converter 223 may operate in a motor mode, drawing electrical power from the DC network 233 and mechanically driving the LP spool, e.g., to manage engine surge margin or turbine temperature during engine transients.

If the gas turbine engine 101 is shut down and an engine start or restart is requested, the control system 260 opens the first set of contactors 241 and closes the second set of contactors 242. In this switching configuration, the AC-side of the second AC-DC converter is connected to the windings 2111 of the first (HP) electrical machine 211. In other words, the AC-sides of first AC-DC converter 221 and the second AC-DC converter 223 are connected in parallel to the windings 2111 of the first electrical machine 211. Therefore, in this mode both the first and second AC-DC power converters 221, 223 can supply starting current to the first (HP) electrical machine 211 for engine starting.

In the starting mode, the DC-sides of the first and second AC-DC converters 221, 223 receive DC electrical power from the DC networks 231, 233. The DC networks 231, 233 may receive their electrical power from an on-board energy storage system 250, for example an on-board battery pack. Additionally or alternatively, one or both of the DC networks 231, 233 may receive power from ground equipment or from an aircraft auxiliary power unit (APU) equipped with an electrical generator.

The ability to connect the AC-sides of the first and second AC-DC converters 221, 223 may reduce the rating requirement of first AC-DC converter 221. For example, if a current of $I_{start}=2\times I$ is required by the stator windings 2111 for the electrical machine 211 to produce a required starting torque, $T_{start}$, this would usually require an output current rating of the first AC-DC converter 221 to be at least 2×I (typically greater as some overrating is usually desirable). However, in the system of FIG. 2, the second AC-DC converter 223 can contribute half the current, I, and therefore an output current rating of between I and 2I may be adopted for the first AC-DC converter 221. Even with the addition of the required switchgear and cables, there is expected to be an improvement in weight, volume and cost.

Alternatively, if the rating of the first converter 221 is not reduced, the electrical machine 211 is able to produce a higher staring torque without necessarily requiring any increase in the size of the first electrical machine. This increase in starting torque may be useful during abnormal conditions such as extreme cold or emergency restart.

After the engine start or restart has been completed, it will be desirable to reconnect the AC-side of the second AC-DC converter 223 to the windings 2131 of the second (LP) electrical machine 213 so that it can, e.g., generate electrical power. To reduce the risk of arcing of the contactors 242 when they are opened, the control system 260 may first control the switching state of the transistors (e.g., MOSFETs) of the second AC-DC converter 232 to prevent current flow therethrough. For example, the control system 260 may turn off all active transistors before opening the second set of contactors 242 and closing the first set of contactors 241. With a relatively low voltage and AC frequency at both of the electrical machines 211, 213 and a normal DC-side voltage, the converter diodes are reversed biased and so there is no prospect of uncontrolled diode conduction, allowing the contactor 242 to be opened at zero current, avoiding any arcing and minimizing wear. Once the paralleling contactor 242 is open, the LP machine contactor 241 may be closed again without causing uncontrolled diode conduction.

In the present example, the gas turbine engine 101 is a two-spool engine. However, the example of FIG. 2 is equally applicable to a three-spool gas turbine engine. In this case, the LP spool may be replaced by the IP spool. Alternatively, the HP spool may be replaced by the IP spool with the IP spool the designated starting spool.

Figure 3:
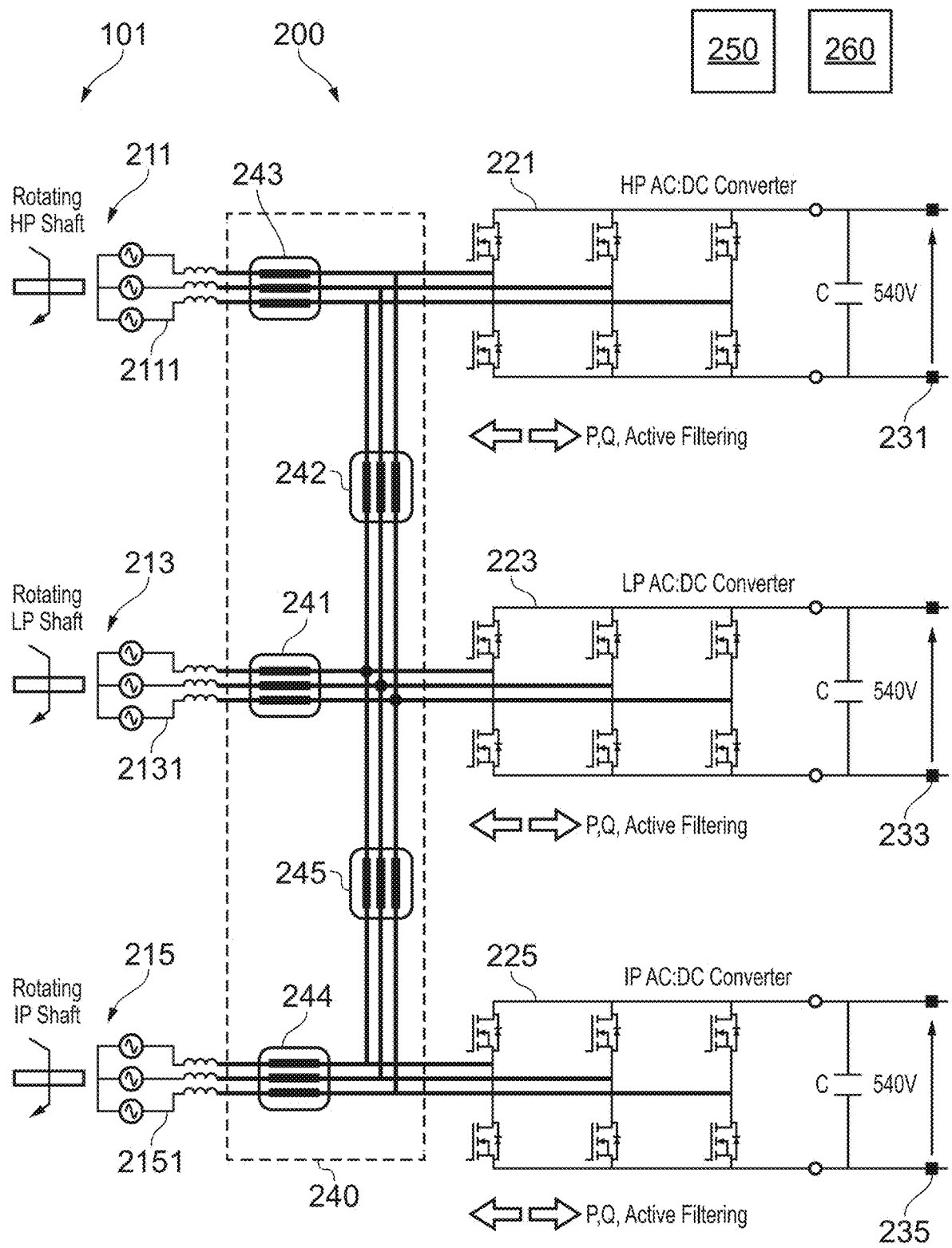
FIG. 3 is a schematic diagram of an example aircraft power and propulsion system, including a three-spool gas turbine engine.

FIG. 3 illustrates a portion of another exemplary aircraft power and propulsion 200. The system 200 is similar that of FIG. 2, but differs in that:

The gas turbine engine 101 is a three-spool engine and therefore also includes an IP spool.

The IP spool is mechanically coupled to a rotor of a third electrical machine 215.

The system further includes a third AC-DC power converter 225, a DC-side of which is connected to a third DC electrical network 235. The third DC electrical network 235 may be independent of the first and second DC networks 231, 233, or may actually be the same DC network (i.e., DC networks 231, 233, 235 are a single DC network).

The controllable switching arrangement 240 provides additional reconfigurability, described below.

Like the switching arrangement of FIG. 2, the switching arrangement 240 of FIG. 3 includes a first contactor set 241 between the AC-side of the second AC-DC converter 223 and the winding 2131 of the second electrical machine 241, and a second contactor 242 between the AC-side of the second AC-DC converter 223 and the winding 2111 of the first electrical machine 241. The switching arrangement 240 of FIG. 3 further includes a third contactor 243, a fourth contactor 244 and a fifth contactor 245. The third contactor 243 is between the AC-side of the first AC-DC converter 221 and the winding 2111 of the first electrical machine 241. The fourth contactor 244 is between the AC-side of the third AC-DC converter 225 and the winding 2151 of the third electrical machine 215. The fifth contactor 245 is between the AC-side of the third AC-DC converter 225 and the winding 2131 of the second electrical machine 213. As noted previously, the contactors 242-245 of the switching arrangement 240 may take a different form, for example solid-state circuit breakers.

The switching arrangement 240 of FIG. 3 provides various possible configurations, and the configuration may be changed during a starting period of the engine 101 in order to alter which electrical machines 211, 213, 215 are being used as motors. For example, the system 200 could start with all three converters 221, 223, 225 operating in parallel and only supplying the HP electrical machine 211 providing an initial very high starting current and torque. This could subsequently change to using two converters 221, 223 operating in parallel motoring the HP spool with the remaining converter 225 being used to motor the IP spool via the third electrical machine 215 once a desired HP spool rotational speed had been reached.

In addition to increasing the starting torque and/or reducing the current rating of the AC-DC converters 221, 223, 225, the system arrangements shown in FIGS. 2 and 3 may provide benefits during faulted conditions. For example, if there was a failure of one of the electrical machines (e.g., electrical machine 211), the faulted electrical machine 211 may be isolated whilst leaving its associated power electronics converter 221 to support the other electrical machines 213, 215 and the overall electrical distribution system. For example, if the HP electrical machine 211 was isolated, the HP AC-DC converter 221 could be connected in parallel with the LP AC-DC converter 223, allowing more electrical power to be extracted from LP spool (by the second electrical machine 213), thus providing a temporary overload rating limited by the second electrical machine 213 and not the second power electronics converter 223.

Further, the parallel combination of the two converters (e.g., converters 221, 223) provides a higher reactive power capability (denoted by Q). The reactive power capability may be used as a means to implement "field-weakening", which may be used to control the machine terminal 3-phase voltage. This may be particularly useful in the implementations described herein due to the high speed range of, e.g., the HP spool that provides a correspondingly high range of terminal voltage. For example, the higher reactive power may be utilized to provide a higher degree of field-weakening control to reduce the machine terminal voltage at high rotational speed.

An additional parallel converter (e.g., the addition of HP converter 221 in parallel with LP converter 223) could also be used as an active harmonic filter, improving the quality of the sinusoidal currents flowing in the, e.g., LP electrical machine stator windings. This may in turn reduce a level of torque ripple at the driving shaft and mechanical drive train.

While the power converters 221, 223, 225 of FIGS. 2 and 3 are shown to be AC-DC power converters, and the electrical network(s) 231, 233, 235 are DC electrical networks, alternative configurations are possible and within the scope of the present disclosure. For example, the electrical network(s) 231, 233, 235 may be AC electrical networks, and the converters 221, 223, 225 may be AC-AC power converters. Each AC-AC converter, which may be a back-to-back arrangement of an AC-DC and an DC-AC converter or another suitable arrangement such as a matrix converter, may convert between a constant electrical frequency of the associated AC electrical network and a variable frequency at the winding terminals of the associated electrical machine 211, 213, 215.

Figure 4:
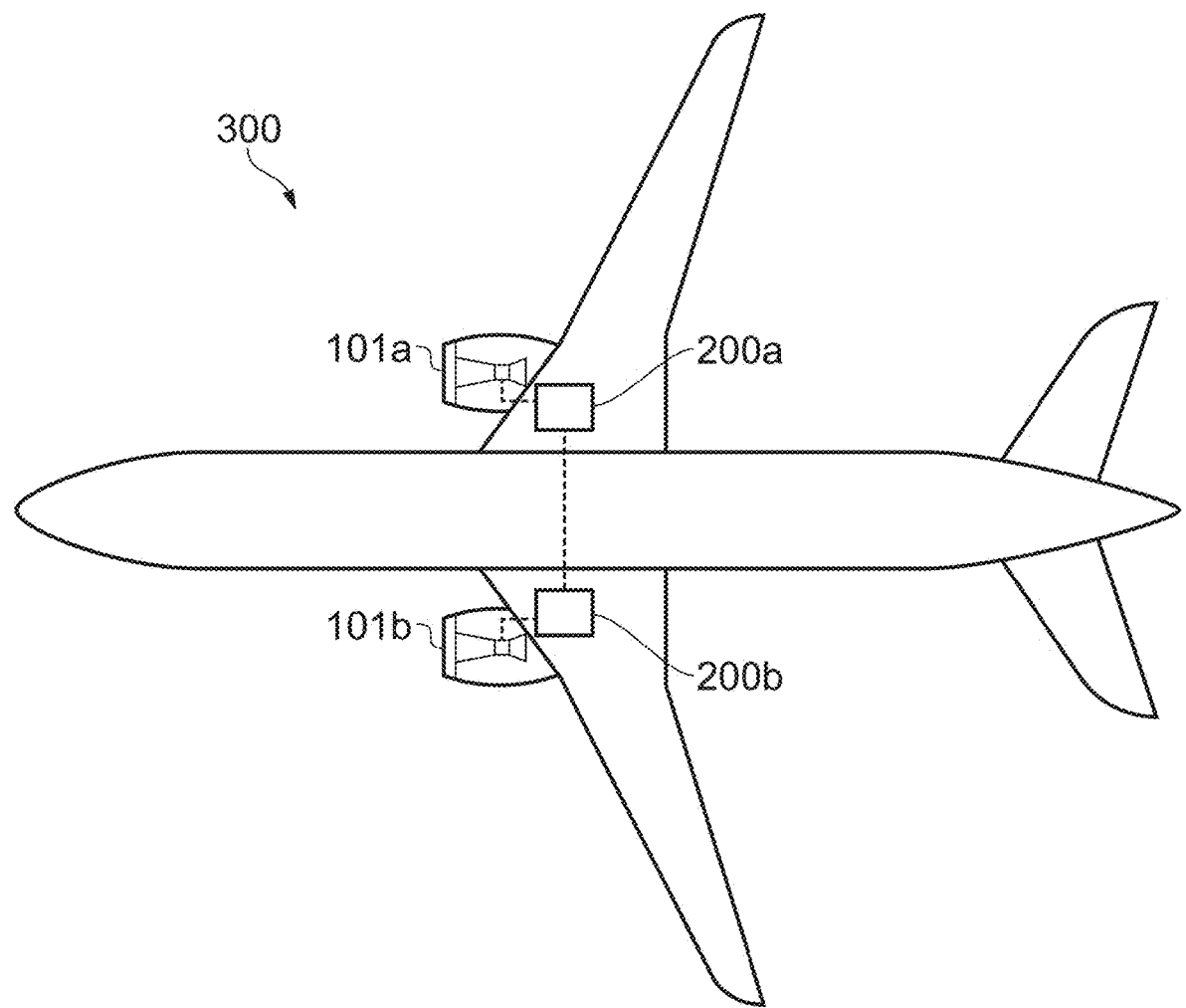
FIG. 4 is a schematic illustration of an aircraft comprising a power and propulsion system.

FIG. 4 illustrates an aircraft 300 comprising a first gas turbine engine 101a associated with a first power and propulsion system 200a and a second gas turbine engine 101b associated with a second power and propulsion system 200b. The gas turbine engines 101a, 101b may be of any suitable configuration, for example two-spool engines or three-spool engines. The power and propulsion systems 200a, 200b may be as described above with reference to FIGS. 2 and 3. FIG. 4 also shows, via dashed lines, that one or more of the DC electrical networks of the two power and propulsion systems 200a, 200b may optionally be electrically connected. Aircraft in accordance with the present disclosure may have one, two, or more than two gas turbine engines 101.

Figure 5:
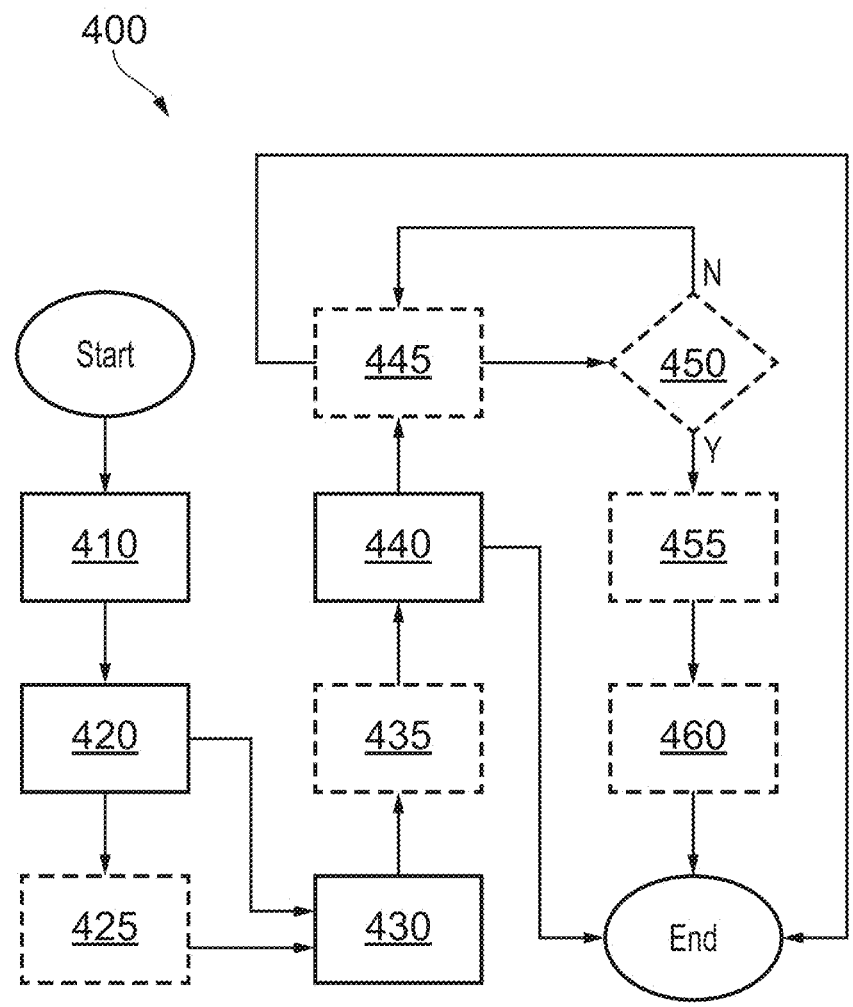
FIG. 5 is a flow chart illustrating a method of starting or restarting a gas turbine engine of an aircraft.

FIG. 5 is a flow chart illustrating a method 400 of starting a gas turbine engine 101. The gas turbine engine 101 may be of any suitable configuration, including a two-spool gas turbine engine or a three-spool gas turbine engine. Optional steps, which may optionally be implemented in a three-spool gas turbine engine equipped with an electrical machine on each spool, have dashed lines. The method 400 may be implemented by a control system 260, for example an EEC or FADEC, of the power and propulsion system 200 or aircraft 300.

The method starts with the gas turbine engine 101 shut down. The aircraft 300 may be on the ground and the engine 101 shut down after a period of inactivity, or the aircraft 300 may be in flight with the engine shut down either intentionally or following a flameout event.

At 410, the control system 260 receives a request to start or restart the engine 101. For example, a pilot of the aircraft 300 may initiate a start or restart procedure.

At 420, in response to the request, the control system 260 controls the switching arrangement 240 to disconnect the first side of the second power converter 223 from the winding 2113 of the second electrical machine 213 and to connect the first side of the second power converter 223 to the winding 2111 of the first electrical machine 211. Thus, the respective first sides of the first and second power converters 221, 223 are connected in parallel to the winding 2111 of the first electrical machine 211.

If the engine 101 has two spools, the method proceeds to step 430. If the engine 101 has three spools and the third spool is equipped an electrical machine 215 and power converter 225, the method may, optionally, instead proceed to step 425.

At step 425, the control system 260 controls the switching arrangement 240 to disconnect the first side of the third power converter 225 from the winding 21511 of the third electrical machine 215 and to connect the first side of the third power converter 225 to the winding 2111 of the first electrical machine 211. Thus, following step 425, the respective first sides of the first, and second and third power converters 221, 223, 225 are connected in parallel to the winding 2111 of the first electrical machine 211.

At step 430, one or more electrical power sources supplies electrical power to the first and second electrical networks 231, 233. As noted above, the first and second electrical networks 231, 233 may be the same electrical network, in which case the power source only needs to supply one electrical network. The power source may be an on-board energy storage system (e.g., a battery pack 250), ground equipment, an APU of the aircraft 300 or another source.

If the engine 101 has two spools, the method proceeds to step 440. If the engine 101 has three spools and step 425 has been performed, the method proceeds to step 435.

At step 435, one or more electrical power sources supplies electrical power to the third electrical networks 235. As noted above, the third electrical network 235 may be the same electrical network as the first and/or second electrical network 231, 233. The power source may be an on-board energy storage system (e.g., a battery pack 250), ground equipment, an APU of the aircraft 300 or another source.

At step 440, the respective first sides of the first and second power converters 221, 223, which are connected in parallel, supply the first electrical machine 211 with current so that the rotor of the first electrical machine 211 provides torque to the first spool. The first spool is a (or the) designated starting spool of the engine 101. Due to the parallel connection of the first and second power converters 221, 223, the first electrical machine 211 is able to receive a current greater than the rated current of each respective converter 221, 223.

If the engine 101 is a two-spool engine, step 440 may continue until the first spool reaches a rotational speed sufficient to light the combustion equipment of the engine. After this, the method 400 finishes. The same may apply if the engine 101 is a three-spool engine. However, if the engine 101 is a three-spool engine and steps 425 and 435 have been performed, the method may proceed to step 445.

At step 445, the first side of the third power converters 225, which is connected in parallel with the first and second power converters 221, 223, supplies the first electrical machine 211 with current. Thus, all three of the first, second and third converters 221, 223, 225 supply starting current to the first spool. This may further reduce the required output current rating of the first converter 221 and/or allow a greater starting torque to be delivered to the first spool.

Step 445 may continue until the first spool reaches a rotational speed sufficient to light the combustion equipment of the engine, at which point the method 400 finishes. In other embodiments, however, the method may instead proceed to step 450.

At step 450, the control system 260 determines whether a rotational speed of the first spool has passed a threshold speed. The threshold speed may be a starting speed associated with the first spool, or may be a lower speed (e.g., a predefined percentage of the starting speed, such as 75% of the starting speed). The determination may be made based on any direct or indirect measurement of the rotational speed, for example a measurement of the rotor speed of the first electrical machine 211, or a pressure at a preselected compressor stage of the engine 101. If a determination is made that the first spool has not reached the threshold rotational speed ("N" in FIG. 5), the method returns to step 445 so that the rotational speed of the first speed is increased further. If a determination is made that the first spool has reached the threshold speed ("Y" in FIG. 5), the method proceeds to step 455.

At step 455, the control system 260 controls the switching arrangement 240 to disconnect the first side of the third power converter 225 from the winding 2111 of the first electrical machine 215 and to connect the first side of the third power converter 225 to the winding 2151 of the third electrical machine 215. The method then proceeds to step 460.

At step 460, the first side of the third power converters 225 supplies the third electrical machine 215 with current to deliver a torque to drive rotation of the third spool. This may continue until a rotational speed of the first spool and/or the third spool reach rotational speeds desired for starting the gas turbine engine 101. At this point, the combustion equipment of the engine 101 is lit and the method 400 ends.

Driving rotation of both the first spool (e.g., the HP spool) and the third spool (e.g., the IP spool) may be preferable in a three-spool engine. For example, it may increase the rate of success of starting the engine, reduce a fuel burn associated with the start process, or reduce an overall amount of energy expended in the restart process. The three converters 221, 223, 225 initially cooperate to provide a high torque for driving the first spool, possibly from zero or very low speed where a higher torque may be desirable. After an adequate speed has been reached, the connection of the third converter 225 is reconfigured to reduce the torque provided to the first spool and provide a moderate torque to the third spool. Generally, the rotation of the first spool will have drawn air through the engine 101 and caused some rotation of the third spool, which may mean only a relatively modest torque is required to accelerate the third spool up to its desired speed.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

It will also be appreciated that whilst the invention has been described with reference to aircraft and aircraft propulsion systems, the electric machine drive techniques described herein could be used for many other applications. These include, but are not limited to, automotive, marine and land-based applications.

The invention claimed is:

1. An aircraft power and propulsion system, comprising:
 a gas turbine engine having a first spool and a second spool, the first spool being a designated starting spool;
 one or more electrical networks;
 a first electrical machine mechanically coupled with the first spool;
 a second electrical machine mechanically coupled with the second spool;
 a first power converter having a first side and a second side, wherein the first side of the first power converter is connected to a winding of the first electrical machine, and the second side of the first power converter is connected to one of the one or more electrical networks;
 a second power converter having a first side and a second side, wherein the second side of the second power converter is connected to one of the one or more electrical networks; and
 a controllable switching arrangement configured so that a connection to the first side of the second power converter is switchable between:
  a winding of the second electrical machine, whereby the second electrical machine and the second power converter are configured to extract power from the second spool in a generator mode or drive rotation of the second spool in a motor mode; or
  the winding of the first electrical machine, whereby the first and second power converters are connected in parallel to the winding of the first electrical machine for supplying a starting current to the winding of the first electrical machine for starting or restarting the gas turbine engine.

2. The aircraft power and propulsion system of claim 1, wherein:
 the first electrical machine is rated to produce at least a rated starting torque, $T_{start}$, of the gas turbine engine; and
 a current, $I_{start}$, required by the winding of the first electrical machine to produce the starting torque is greater than a rated current output of the first power converter but less than or equal to a sum of the rated current output of the first power converter and a rated current output of the second power converter.

3. The aircraft power and propulsion system of claim 1, comprising a control system configured to:
 responsive to a request to start or restart the gas turbine engine, control the switching arrangement to disconnect the first side of the second power converter from the winding of the second electrical machine and to connect the first side of the second power converter to the stator winding of the first electrical machine.

4. The aircraft power and propulsion system of claim 1, comprising a control system configured to:
 following an engine start or restart, stop current flow through the second power converter by controlling a switching state of one or more transistors of the second power converter; and after stopping current flow through the second power converter, controlling the switching arrangement to disconnect the first side of the second power converter from the winding of the first electrical machine and to connect the first side of the second power converter to the winding of the second electrical machine.

5. The aircraft power and propulsion system of claim 1, wherein the controllable switching arrangement is further configured so that a connection to the first side of the first power converter is switchable between:
the winding of the first electrical machine; or
the winding of the second electrical machine.

6. The aircraft power and propulsion system of claim 5, wherein the control system is further configured to:
in response to a fault in the first electrical machine, disconnect the first side of the first power converter from the winding of the first electrical machine and to connect the first side of the first power converter to the winding of the second electrical machine, whereby the faulted first electrical machine is isolated and both the first power converter and the second power converter can receive electrical power from or supply electrical power to the winding of the second electrical machine; and/or
in response to a fault in the second electrical machine, disconnect the first side of the second power converter from the winding of the second electrical machine and to connect the first side of the second power converter to the winding of the first electrical machine, whereby the faulted second electrical machine is isolated and both the first power converter and the second power converter can receive electrical power from or supply electrical power to the winding of the first electrical machine.

7. The aircraft power and propulsion system of claim 1, wherein:
the gas turbine engine is a two-spool gas turbine engine, the first spool is a high-pressure spool, and the second pool is a low-pressure spool; or
the gas turbine engine is a three-spool gas turbine engine, the first spool is a high-pressure spool, and the second pool is an intermediate-pressure spool or low-pressure spool; or
the gas turbine engine is a three-spool gas turbine engine, the first spool is an intermediate-pressure spool, and the second pool is a low-pressure spool.

8. The aircraft power and propulsion system of claim 1, wherein the gas turbine engine has a third spool, and wherein the aircraft power and propulsion system further comprises:
a third electrical machine mechanically coupled with the third spool; and
a third power converter having a first side and a second side, wherein the second side of the third power converter is connected to one of the one or more electrical networks,
wherein the controllable switching arrangement is further configured so that a connection to the first side of the third power converter is switchable between:
a winding of the third electrical machine, whereby the third electrical machine and the third power converter are configured to extract power from the third spool in a generator mode or drive rotation of the third spool in a motor mode; or
the winding of the first electrical machine, whereby the first and third power converters are connected in parallel with the winding of the first electrical machine for supplying a starting current to the winding of the first electrical machine for starting or restarting the gas turbine engine.

9. The aircraft power and propulsion system of claim 8, comprising a control system configured to:
responsive to a request for an engine start or restart attempt, disconnect the respective first sides of the second and third power converters from the windings of the second and third electrical machines and to connect the respective first sides of the second and third power converters to the winding of the first electrical machine, whereby the first, second and third power converters are connected in parallel to the winding of the first electrical machine for supplying a starting current to the winding of the first electrical machine; and
subsequent to connecting the respective first sides of the second and third power converters to the winding of the first electrical machine, disconnecting the first side of the third power converter from the winding of the first electrical machine and connecting the first side of the third power converter to the winding of the third electrical machine, whereby the third power converter can supply current to third electrical machine to drive rotation of the third spool of the gas turbine engine.

10. The aircraft power and propulsion system of claim 9, wherein the control system is configured to disconnect the first side of the third power converter from the winding of the first electrical machine and to connect the first side of third power converter to the winding of the third electrical machine in response to determining a condition to the effect that a rotational speed of the first spool of the gas turbine engine has passed a threshold speed.

11. The aircraft power and propulsion system of claim 8, wherein the first spool is a high-pressure spool, the second spool is a low-pressure spool, and the third spool is an intermediate-pressure spool.

12. The aircraft power and propulsion system of claim 1, further comprising an energy storage system connected to and configured to supply electrical power to one or more of the one or more electrical networks.

13. The aircraft power and propulsion system of claim 1, wherein the one or more electrical networks are DC electrical networks, and wherein the first power converter and the second power converter are AC-DC power converters, the first side of each respective power converter being an AC-side of the power converter, the respective second side of each power converter being a DC-side of the power converter.

14. The aircraft power and propulsion system of claim 1, wherein the one or more electrical networks are AC electrical networks, and wherein the first and second power converter are AC-AC power converters.

15. The aircraft power and propulsion system of claim 14, wherein the first and second AC-AC power converters comprise back-to-back AC-DC and DC-AC stages.

16. The aircraft power and propulsion system of claim 1, wherein the controllable switching arrangement comprises mechanical contactors or solid-state circuit breakers.

17. The aircraft power and propulsion system of claim 1, wherein each respective electrical machine is a permanent magnet synchronous electrical machine, the respective windings being stator windings.

18. An aircraft comprising an aircraft power and propulsion system according to claim 1.

19. A method of starting a gas turbine engine of an aircraft power and propulsion system, the power and propulsion system comprising a gas turbine engine having a first spool and a second spool, the first spool being a designated starting spool; one or more electrical networks; a first electrical machine mechanically coupled with the first spool; a second electrical machine mechanically coupled with the second spool; a first power converter having a first side and a second side, wherein the first side of the first power converter is connected to a winding of the first electrical machine, and the second side of the first power converter is connected to one of the one or more electrical networks; a second power converter having a first side and a second side, wherein the second side of the second power converter is connected to one of the one or more electrical networks; and a controllable switching arrangement, the method comprising:

receiving, by a control system of the power and propulsion system, a request to start or restart the gas turbine engine;

controlling the switching arrangement to disconnect the first side of the second power converter from the winding of the second electrical machine and to connect the first side of the second power converter to the winding of the first electrical machine;

supplying electrical power from one or more electrical power sources to the electrical network connected to the second side of the first power converter and to the electrical network connected to the second side of the second power converter; and supplying electrical power from both the first power converter and the second power converter to the winding of the first electrical machine to produce a starting torque for starting the gas turbine engine.

20. A method of starting a gas turbine engine of an aircraft power and propulsion system, the power and propulsion system comprising: a gas turbine engine having a first spool, a second spool, and a third spool, the first spool being a designated starting spool; one or more electrical networks; a first electrical machine mechanically coupled with the first spool; a second electrical machine mechanically coupled with the second spool; a third electrical machine mechanically coupled with the third spool; a first power converter having a first side and a second side, wherein the first side of the first power converter is connected to a winding of the first electrical machine, and the second side of the first power converter is connected to one of the one or more electrical networks; a second power converter having a first side and a second side, wherein the second side of the second power converter is connected to one of the one or more electrical networks; a third power converter having a first side and a second side, wherein the second side of the third power converter is connected to one of the one or more electrical networks; and a controllable switching arrangement, the method comprising:

receiving, by a control system of the power and propulsion system, a request to start or restart the gas turbine engine;

controlling the switching arrangement to disconnect the first side of the second power converter from the winding of the second electrical machine and to connect the first side of the second power converter to the winding of the first electrical machine;

controlling the switching arrangement to disconnect the first side of the third power converter from the winding of the third electrical machine and to connect the first side of the third power converter to the winding of the first electrical machine;

supplying electrical power from one or more electrical power sources to the electrical network connected to the second side of the first power converter, to the electrical network connected to the second side of the second power converter, and to the electrical network connected to the second side of the third power converter;

supplying electrical power from the first power converter, the second power converter and the third power converter to the winding of the first electrical machine to produce a starting torque for driving rotation of the first spool;

detecting a condition to the effect that a speed of the first spool has passed a threshold;

controlling the switching arrangement to disconnect the first side of the third power converter from the winding of the first electrical machine and to connect the first side of the third power converter to the winding of the third electrical machine; and supplying electrical power from the third power converter to the winding of the third electrical machine to produce a starting torque for driving rotation of the third spool.

* * * * *